US007460501B2

(12) United States Patent
Sherman

(10) Patent No.: US 7,460,501 B2
(45) Date of Patent: *Dec. 2, 2008

(54) METHOD FOR ENABLING INTEROPERABILITY BETWEEN DATA TRANSMISSION SYSTEMS CONFORMING TO IEEE 802.11 AND HIPERLAN STANDARDS

(75) Inventor: Matthew J. Sherman, Succasunna, NJ (US)

(73) Assignee: AT&T Intellectual Property II, L.P., Bedminster, NJ (US)

( * ) Notice: Subject to any disclaimer, the term of this patent is extended or adjusted under 35 U.S.C. 154(b) by 414 days.

This patent is subject to a terminal disclaimer.

(21) Appl. No.: 11/212,946

(22) Filed: Aug. 26, 2005

(65) Prior Publication Data

US 2006/0002357 A1 Jan. 5, 2006

Related U.S. Application Data

(63) Continuation of application No. 10/045,980, filed on Jan. 1, 2002, now Pat. No. 7,031,274.

(60) Provisional application No. 60/261,935, filed on Jan. 16, 2001.

(51) Int. Cl.
*H04J 3/00* (2006.01)
(52) U.S. Cl. .................. 370/321; 370/337; 370/341; 370/458; 370/462; 455/450
(58) Field of Classification Search .................. None
See application file for complete search history.

(56) References Cited

U.S. PATENT DOCUMENTS 5,933,111 A    8/1999  Schroeder
5,956,638 A *  9/1999  Chang et al. ................. 455/423
6,198,728 B1 * 3/2001  Hulyalkar et al. ......... 370/310.1
7,031,274 B2 * 4/2006  Sherman ....................... 370/321
2004/0141522 A1* 7/2004  Texerman et al. ........... 370/466

FOREIGN PATENT DOCUMENTS

EP    1111843    6/2001

OTHER PUBLICATIONS

U.S. Appl. No. 60/230,412, Yossi Texerman, filed Aug. 2000, HLAN Proposal For A Global 5GHz Protocol.*
U.S. Appl. No. 09/981,240, filed Oct. 18, 2001, Britz.
U.S. Appl. No. 09/978,581, filed Oct. 18, 2001, Britz.
U.S. Appl. No. 09/875,767, filed Jun. 1, 2001, Ghassemzadeh.

(Continued)

*Primary Examiner*—Firmin Backer
*Assistant Examiner*—Roberta A Shand
(74) *Attorney, Agent, or Firm*—Michael Haynes PLC; Michael N. Haynes; Dale R. Jensen

(57) ABSTRACT

Mechanisms, in a transmission channel shared by 802.11 systems and HIPERLAN/2 systems are provided to prevent 802.11 terminals from transmitting during time periods allocated to HIPERLAN, so that a single channel can be shared between the two standards. In a particular embodiment, a "super frame" format is used where HIPERLAN transmissions are offered the highest level of protection possible within 802.11, which is needed within the 802.11 Contention Free Period (CFP).

11 Claims, 2 Drawing Sheets

OTHER PUBLICATIONS

U.S. Appl. No. 60/269,354, filed Feb. 1, 2001, Lin.
U.S. Appl. No. 10/042,142, filed Jan. 11, 2002, Lin.
U.S. Appl. No. 10/042,143, filed Jan. 11, 2002, Lin.
U.S. Appl. No. 10/042,165, filed Jan. 11, 2002, Lin.
U.S. Appl. No. 10/042,179, filed Jan. 11, 2002, Lin.
U.S. Appl. No. 10/042,166, filed Jan. 11, 2002, Lin.

* cited by examiner

HIPERLAN/2 Formats
802.11 Formats
802.11 Management Frames
Optional 802.11 Management Frames B = Beacon
E = CF_End
X = Blocking or Spoofing Frame Sequence

METHOD FOR ENABLING INTEROPERABILITY BETWEEN DATA TRANSMISSION SYSTEMS CONFORMING TO IEEE 802.11 AND HIPERLAN STANDARDS

CROSS-REFERENCES TO RELATED APPLICATIONS

This application is a continuation of U.S. patent application Ser. No. 10/045,980, filed 1 Jan. 2002 now U.S. Pat. No. 7,031,274, by the same inventors and similarly titled.

This application claims priority of provisional application 60/261,935 filed Jan. 16, 2001.

FIELD OF THE INVENTION

This invention relates to data transmission systems and to their controlling operating standards. It is also concerned with wireless local area networks (WLAN) and with allowing operability between two standards and in particular to interoperability between 802.11a standards and HIPERLAN standards.

BACKGROUND OF THE INVENTION

Wireless data transmission is a rapidly growing field. One increasingly popular form of such transmission is wireless local areas networks (WLANs). A number of standards currently exist for WLANs. However, they tend to be fragmented and largely incompatible. There is a desire for a worldwide standard that would allow a single device to function virtually anywhere in the world providing high-speed connectivity.

WLANs require specific protocols to transmit information, as do wired LANs. With numerous stations along a network, LAN stations must take care to prevent collisions if more than one station wishes to transmit information in the LAN. The situation is more critical in the wireless environment (i.e., WLANs) since wireless stations and wireless access points behave differently from wired stations.

Recently, bands have opened up between 5 and 6 GHz, which may permit a worldwide standard. Wireless standards are being developed to utilize those bands. One such standard is HIPERLAN/2 (High Performance Radio Local Area Network Type 2), which is of European origin. Another such standard is IEEE 802.11a, which originates primarily in the US. Japan is developing standards similar to both those in the US and Europe. Both the US and European standards profess similar levels of performance, and use very similar waveforms to communicate. However, the two standards are currently incompatible. Particularly at the Media Access Control (MAC) layer. As such, a large push has developed to create a single hybrid standard, or provide some means for the two standards to easily interoperate.

Many situations occur where 802.11a WLANs must substantially coexist with HIPERLAN WLANs. Since they operate at overlapping frequencies, contention collisions are frequent and must be resolved if the two systems are to operate without interference in close proximity to each other.

Methods for interoperation of HIPERLAN and 802.11a systems are being contemplated in which systems conforming to both standards might share one common channel without interference. A super-frame structure has been proposed to support interoperation between the standards. The proposed structure contemplates a super frame with an 802.11 phase and a HIPERLAN/2 phase (See super-frame structure shown in FIG. 3). The super frame has a length of 2 k×2 ms, where k is an integer. Duration of the 802.11 beacon plus the 802.11a phase is set at n×2 ms. The HIPERLAN/2 phase comprises m×2 ms. The sum of m and n would be $2^k$.

This method of facilitating interoperability of HIPERLAN and 802.11a has some drawbacks. For one, this approach presumes that the 802.11 terminals can be prevented from transmitting during the HIPERLAN operating phase. Currently, no mechanism exists within the 802.11 standard to allow this. Also, the problem is best addressed by a solution compatible with existing generations of terminals.

SUMMARY OF THE INVENTION

Mechanisms, in a transmission channel shared by 802.11 systems and HIPERLAN/2 systems are provided in accord with the invention to prevent 802.11 terminals from transmitting during time periods allocated to HIPERLAN, so that a single channel can be shared between the two standards. In a particular embodiment, a "super-frame" format is used where HIPERLAN transmissions are offered the highest level of protection possible within 802.11, which is provided within the 802.11 Contention Free Period (CFP).

DETAILED DESCRIPTION

WLANs are essentially a wireless replication of a wired LAN and in many ways operated in substantially the same manner. There are important differences that must be accommodated. A wireless node is unable to listen while it is transmitting and wireless media are more likely to contain noise and interference than are wired media. Additionally some terminals remain hidden to other terminals even though both may access a particular network. Hidden terminals coupled with an inability of a transmitting terminal to listen may result in collisions as more than one terminal may transmit in the same time interval.

Standards have evolved to avoid such collisions in WLANs. 802.11 is one standard in use in North America and has probable use in Europe and other areas in the world. HIPERLAN is a similar standard for WLANs used in parts of Europe and potentially in North America. It is not unexpected that in some areas there may exist a need to interoperate 802.11 and HIPERLAN/2 systems. Both standards operate in a frequency range that is overlapping hence unless steps are taken to prevent collisions they will likely occur.

Figure 1:
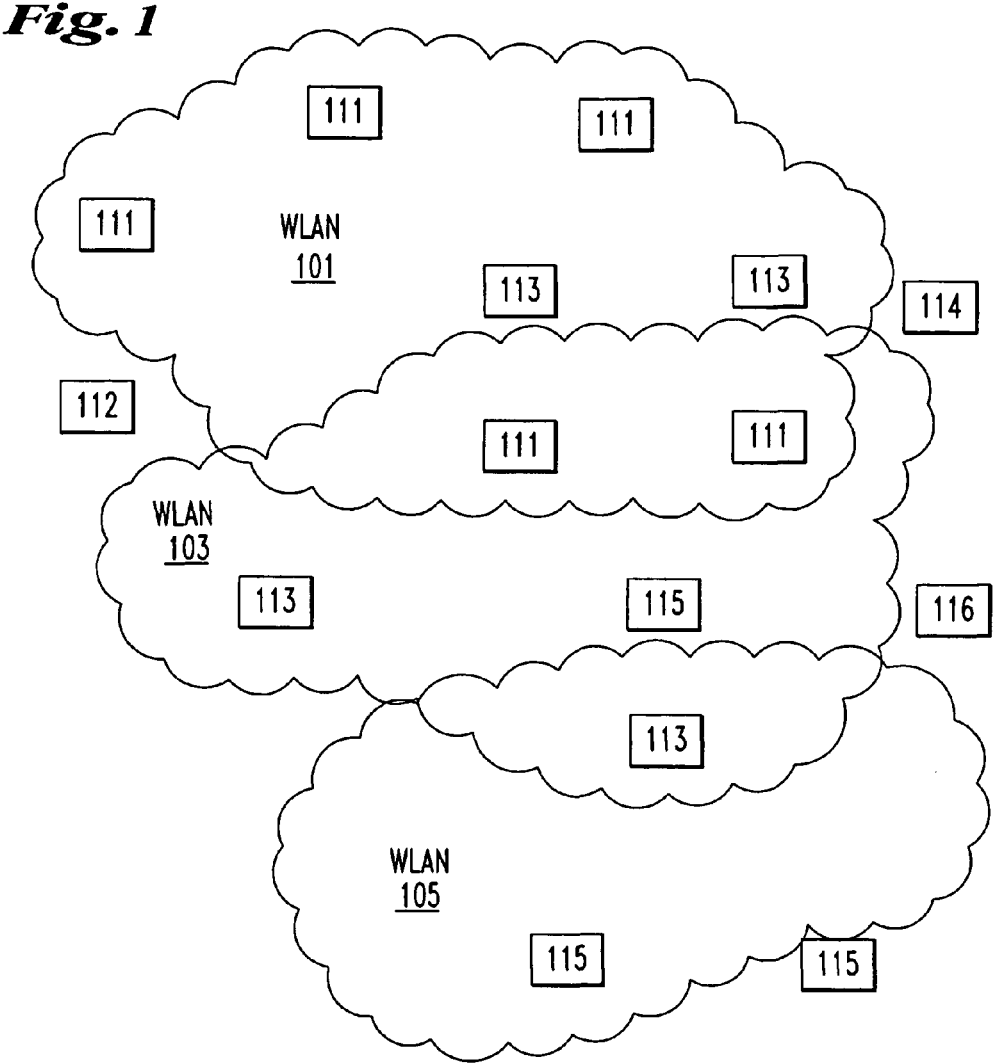
FIG. 1 is a schematic of WLAN systems where interoperability is desirable.

A typical WLAN arrangement is shown in the FIG. 1 wherein several WLANs 101, 103 and 105 which may overlap are shown in close proximity to one another. Each WLAN includes a plurality of stations 111, 113 and 115 through which messages may be sent to and received from that particular WLAN 101, 103 and 105. Each WLAN includes connection to an access port (AP) 112, 114 and 116, which permits communication between WLANs.

WLANs are accessed through stations that operate as the access ports (AP) 112, 114 and 116. AP's provide communications with services and stations outside the immediate set of wireless stations with which it communicates. The service "behind" the AP is termed the Distribution Service (DS) in 802.11. Stations in systems using either or both 802.11 and HIPERLAN/2 protocols should accommodate both. Due to the wireless nature of the WLAN, ordinary stations need not support both systems although such abilities would be desirable since it is most likely that common frequencies will be shared. It is clearly desirable that the APs support both standards (i.e., with a hybrid AP (HAP)).

Figure 2:
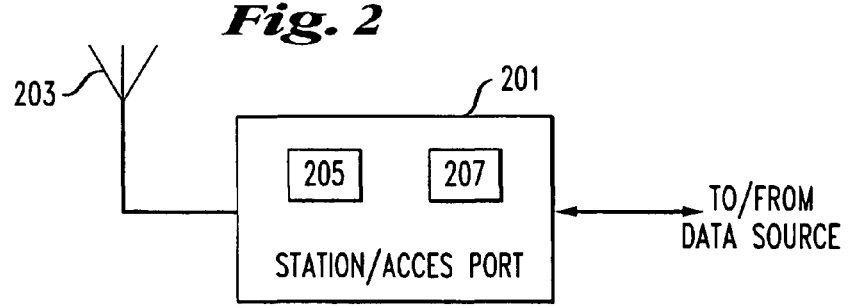
FIG. 2 is a block schematic of a wireless station or access point used in the WLANS.

An illustrative example of a station/access port 201 is shown in the FIG. 2 and includes a wireless antenna 203, a radio signal processing component 205, and a data processing component 207. The data processing component receives data entered from a computer unit and transmits received data from the radio unit to a computer unit of the WLAN. The STA/AP may take many varied forms known to those skilled in the art and hence need not be disclosed in detail.

Some prior solutions to the problem of collisions between competing systems sharing a common frequency band have relied on a spoofing technique to spoof terminals into thinking that the media was busy during a time period identified by a duration field defined by the 802.11 standard. 802.11 STAs have a mechanism called the Network Allocation Vector (NAV) that can be set to prevent the STA from transmitting. However, the NAV is set only under very specific conditions that do not exist at the time the HIPERLAN/2 frames need to seize the medium. Many existing STA cannot be modified to set the NAV based on the detection of HIPERLAN/2 transmissions. A network allocation vector (NAV) normally is set to indicate that a media is busy even if no signal is detected. Hence setting of the NAV may be used to inhibit unwanted transmissions in cases where they might interfere with other transmissions that are undetectable to the potentially interfering station. Possible spoofing frames/frame sequences that could be useful include a CTS transmitted by an AP, a data frame transmitted by an AP, an RTS transmitted by an AP followed by a CTS from a station, the prior RTS/CTS combination followed by an additional CTS frame from the AP, or the prior RTS/CTS combination followed by a data frame. Other frame sequences can also be used with this regard.

Figure 3:
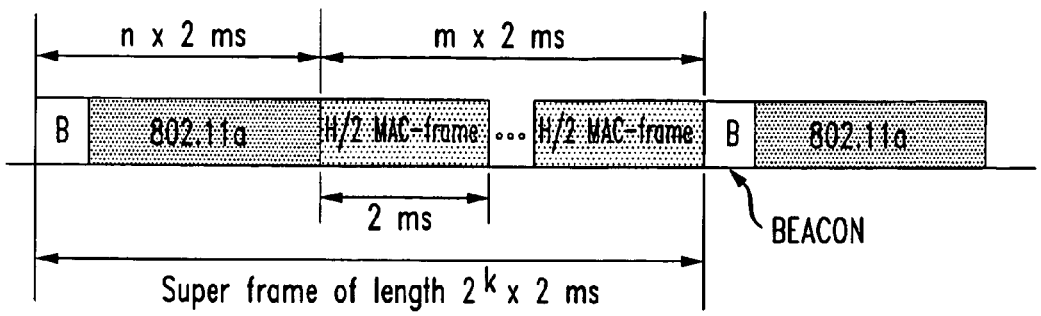
FIG. 3 is a graph of transmission states in the channels of a WLAN in one previously proposed solution concerning interoperability.

In the system shown in FIG. 3, there is no provision to set a NAV to properly cover HIPERLAN/2 transmissions. The solution, shown in FIG. 3, discloses a prior super-frame proposal. The problem is that there is nothing in the proposal that would force 802.11a STA to cease transmissions during the HIPERLAN phase of the Superframe. The 802.11a STA would view the HIPERLAN phase as a part of the 802.11 Contention Period (CP), and would normally be free to transmit during the CP.

Figure 4:
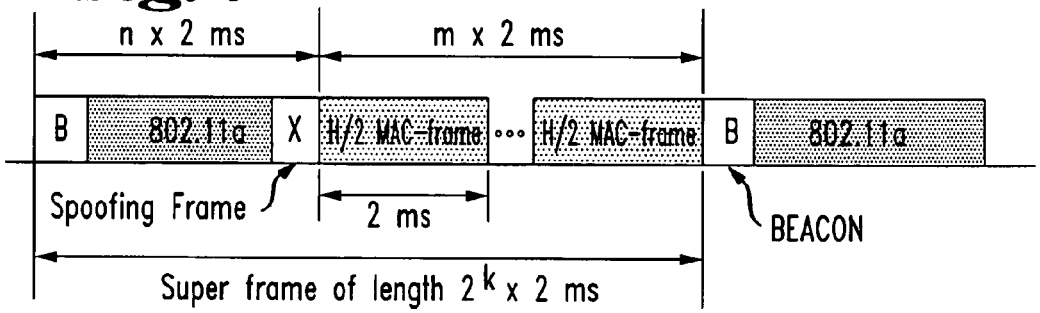
FIG. 4 is a graph of a proposed superframe structure of a contention arrangement for permitting interoperability between 802.11a WLANS and HIPERLAN WLANS.

A modified solution such as shown in the FIG. 4 allows a HAP to transmit a spoofing frame with a duration field set to protect transmissions from HIPERLAN/2 stations. The modified system requires no changes to any legacy (old existing type) STA.

Figure 5:
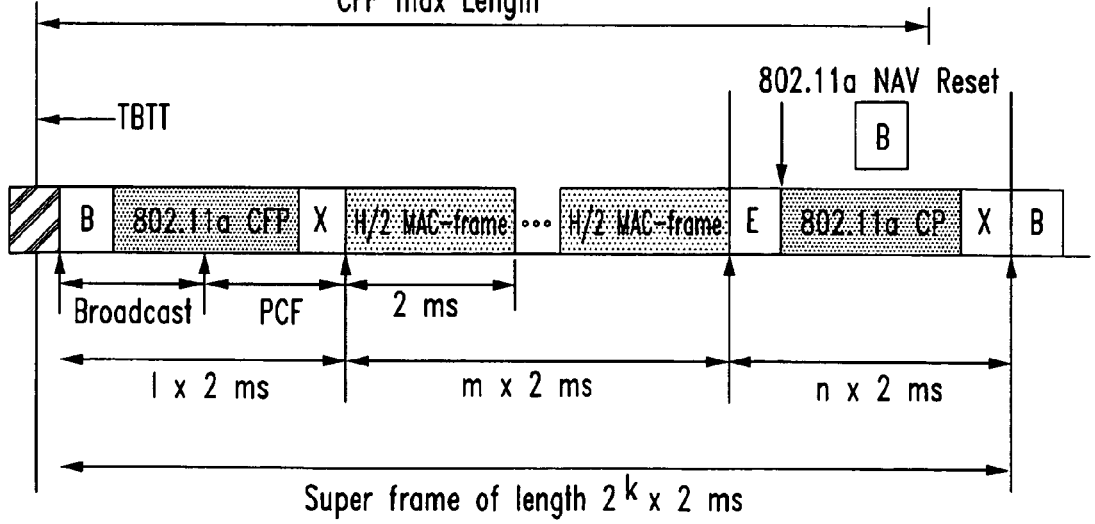
FIG. 5 is graph of an alternative proposed superframe structure of a contention arrangement for permitting interoperability between 802.11a WLANS and HIPERLAN WLANS.

In accord with principles of the invention, a Super-frame structure, shown in FIG. 5 depicting signals of both standards, in a channel, is disclosed herein that allows 802.11 a stations (STA and AP) to share a single channel with HIPERLAN/2 stations. HIPERLAN/2 transmission occurs within the HIPERLAN/2 phase that is buried within the Contention Free Period (CFP) of 802.11. The CFP occurs with a regular period, and all 802.11 terminals set their NAV's during the CFP. To realize such a super frame the following sequence of frames/phases can be used as shown in the graph of FIG. 5.

CFP_Beacon, 802.11 Broadcast, 802.11 CFP, HIPERLAN/2 phase, CF_End, 802.11 CP

Here, CFP_Beacon is a Beacon starting a CFP. Not all Beacons need start a CFP. However, the CFP must recur every integral number of Beacons. The inference is that the Beacon period must be a sub multiple of the super frame size (which is still 2 k time 2 msec). For the method of FIG. 5, three phases exist. A phase here means a collection of frames primarily controlled by a common coordination or access function. The first phase would consist of the CFP_Beacon, 802.11 Broadcast, and 802.11 CFP. The sum time occupied by this phase is an integral number times 2 msec, and that number is specified as 1 for this illustrative example. Also note that the term "Broadcast" here is used in a generic nature meaning Broadcast and Multicast frames. The HIPERLAN/2 phase would remain at n times 2 msec, and the CF_End, 802.11 CP would have to be m times 2 msec. The sum 1+m+n must be $2^k$. Note that from an 802.11 perspective, all transmissions from the CFP_Beacon to the CF_End (including those from HIPERLAN stations) would be considered as the 802.11 CFP. While the AP would restrict all CFP data transmissions to occurring in the first "Phase" of the superframe, the 802.11 stations operating in this structure would be unaware of the "Phases" and would only see one large CFP, with part of it full of undetectable transmissions (the HIPERLAN/2 transmissions).

FIG. 5 is meant to be illustrative of the advantages of nesting the HIPERLAN/2 phase within the CFP, rather than the CP. It represents the most limiting interpretation of the existing 802.11-1999 standard, and most restrictive CFP scheduling rules. Depending on the flexibility available within the 802.11 system, other orderings of the phases under the CFP may be possible, and would be within the spirit of this invention. Such orderings would have various advantages and disadvantages.

The key issue is support for 802.11 Power Saving (PS) stations. These stations spend as much of their time as possible in the "dose" state, where they cannot receive or transmit frames, but consume little power. They awake every so many Beacon Intervals (the time between Beacons) to see if there is are any pending frames for them. The Beacon frame contains a Delivery Traffic Indication Message (DTIM) element when any associated 802.11 stations are in PS mode. The 802.11 stations indicate to the AP how often they wake up (their listen interval). The AP buffers traffic for each station for at least their listen interval before discarding it. Stations indicate what PS mode they currently are in with every frame they transmit.

When stations in the PS mode are present, the AP is required to maintain a DTIM interval. This interval indicates the number of Beacons that occur between Beacons where delivery of broadcast/multicast frames will be attempted. Beacons which announce the delivery of broadcast/multicast frames are called DTIMs. Each Beacon contains a count down to the Beacon where delivery of broadcast/multicast messages will be attempted, as well at the interval between such beacons. When Broadcast frames are delivered in the presence of stations in the PS mode, they must be delivered before any directed (unicast or addressed to a single station) frames. In addition, for CFP_Beacon, the beacon must indicate in the DTIM element which PS stations the AP intends to poll during that CFP. That enables the PS stations to know when they must remain awake to receive broadcast/multicast frames, or frames addressed to them. Otherwise stations only awake once per their listen interval (and at the DTIM intervals if the must receive Broadcast/Multicast messages), and go back to their dose state immediately if no frames need to be received. Note that CFP_Beacons must also be DTIM Beacons, though the reverse is not true.

Given that PS stations will be staying awake (wasting power) to receive frames announced by the Beacon, and that broadcast/multicast messages must always be transferred first, the ordering of FIG. 5 is the most obvious solution. However, nothing in the standard prevents the delivery of HIPERLAN/2 frames before the delivery of 802.11 broadcast frames. In addition, during the CFP, all 802.11 stations will remain quite until CFP max Interval regardless of whether the channel is occupied by a known signal. They recognize the HIPERLAN/2 phase as a part of the CFP. So there is no reason why the HIPERLAN/2 phase could not be first after the beacon, followed by broadcast/multicast messages, and the "CFP" phase. This reordering actually provides the maximum scheduling flexibility, at the penalty of PS stations having to remain awake during the HIPERLAN/2 phase.

Also, while polling of 802.11 stations during the CFP needs to be in Association ID (AID) order (with broadcast/multicast messages being sent first) nothing prevents HIPERLAN/2 messages from intervening at any point during polling cycle of the CFP. Thus, it is possible to have a broadcast phase start immediately after the Beacon, be interrupted by the HIPERLAN/2 phase, and then have the broadcast phase pick up again after the HIPERLAN/2 phase completes. Or, the CFP phase could be interrupted by the HIPERLAN/2 phase, and then continue afterwards followed by the CP. To the 802.11 stations, the Broadcast phase, CFP phase, and HIPERLAN/2 phase all appear as a single CFP phase. Thus, any ordering of these phases will work, and are within the spirit of the invention. The key is that the HIPERLAN/2 phase should occur during the CFP phase where it has additional protection from 802.11 stations since their NAV's are set for the CFP.

In the graph of FIG. 5, synchronization of signaling is secured by use of the beacon frames "B" (a management frame), which define the superframe size or more correctly the times between CFPs. 802.11 MAC access functions are controlled by coordination functions of which DCF is a distributed coordination function and PCF is a centralized (point) coordination function. CFP Max length is the maximum length of a contention free period within the 802.11 system whose end is marked by "E" the CF-End management frame shown occurring at less than the maximum). As shown, the HIPERLAN/2 format transmissions (H/2 MAC-frame) occur during a portion of the 802.11 CFP. The CFP period also includes a "CFP" phase (i.e., a period of time within the CFP where actual data is delivered using the CFP's contention free protocols). Following the end of the CFP at "E" an 802.11a format CP (contention period) is activated. A management frame "X" to permit blocking and spoofing is incorporated both before HIPERLAN/2 transmissions and immediately before the next subsequent CFP_Beacon "B". If desired "X" may be incorporated on only one or indeed none of these intervals. Blocking and spoofing are discussed in my co pending application discussed herein above. Hence, by embedding HIPERLAN/2 transmissions within the contention free period of the 802.11a format both systems operate with out interference to/from each other and coordinating access via a Hybrid Access Port (which knows the timing of both systems).

The HIPERLAN/2 phase is viewed by 802.11 terminals as part of the CFP, and accorded protection accordingly. The CFP's maximum length (determined by the parameter CFP max length) is determined by a variable regularly broadcast in Beacon messages. It is optimally set very close to the full length of the superframe. To relinquish the time to the CP, when the CF_End is sent, all terminals automatically reset their NAV's. Normal CP transmissions would then occur. Note that additional Beacons might occur during the CP that do not start a new CFP. The existence of these Beacons may make it easier to handle broadcast traffic, and 802.11 power saver terminals, but is not a requirement.

Beacon jitter may result in jitter in the superframe. IPERLAN/2 is not very tolerant of jitter. However, by utilizing spoofing frames jitter before the Beacon can be controlled. Also by allowing the broadcast/CFP traffic to be interrupted by the HIPERLAN/2 phase, it is possible to ease some of the Beacon jitter restrictions while maintaining precise timing for the HIPERLAN/2 phase. The system would schedule the HIPERLAN/2 phase to be some time after the CFP_Beacon. Since the Beacon would jitter, the time between it and the HIPERLAN/2 phase would vary. But this time could be filled with 802.11 CFP traffic. The 802.11 traffic would be suspended by the AP just prior to the HIPERLAN/2 phase start time, and would resume after the HIPERLAN/2 phase. Alternatively, the Access Port (AP) could broadcast dummy traffic just prior to the CFP_Beacon preventing other traffic from seizing the medium. In addition, while it is unlikely to be needed, a spoofing frame or frame sequence could still be transmitted prior to the HIPERLAN/2 phase if desired to further assure that no 802.11 STA are active during the HIPERLAN/2 phase.

While this invention has been exemplified as a system for handling 802.11 and HIPERLAN/2 transmissions, its principles may be applicable to other transmission systems such as Bluetooth, HomeRF or WiMedia. Such systems may also be known at times a Personal Area networks (PANS) rather than WLANs. These applications will be obvious to those skilled in the art.

What I claim is:

1. A method comprising:
   in a wireless network comprising a first device and a second device, the first device adapted to transmit a first wireless signal using a first access protocol, the second device adapted to transmit a second wireless signal using a second access protocol:
   assembling a spoofing frame sequence from an RTS frame and a CTS frame, the RTS frame transmitted by an access point associated with the first access protocol, the CTS frame transmitted by the first device; and
   transmitting the spoofing frame sequence to restrict data transmissions from the first device to the wireless network.

2. The method of claim 1, further comprising:
   assigning the first wireless signal to a first phase occupying a first sum time.

3. The method of claim 1, further comprising:
   assigning the first wireless signal to a first phase occupying a first sum time of an integral number times 2 msec.

4. The method of claim 1, further comprising:
   assigning the second wireless signal to a second phase occupying a second sum time.

5. The method of claim 1, further comprising:
   assigning the second wireless signal to a second phase occupying a second sum time of an integral number times 2 msec.

6. The method of claim 1, further comprising:
   communicating an allocated time period for the first access protocol to the first device.

7. The method of claim 1, further comprising:
   communicating an allocated time period for the second access protocol to the first device.

8. The method of claim 1, further comprising:
communicating an allocated time period for the first access protocol to the second device.

9. The method of claim 1, further comprising:
communicating an allocated time period for the second access protocol to the second device.

10. The method of claim 1, wherein the first device uses an 802.11 access protocol.

11. The method of claim 1, wherein the second device uses a HIPERLAN/2 access protocol.

* * * * *